(12) United States Patent
Forrest

(10) Patent No.: US 6,254,505 B1
(45) Date of Patent: Jul. 3, 2001

(54) DIFFERENTIAL CROSS PIN RETENTION

(75) Inventor: James L. Forrest, Ashley, IN (US)

(73) Assignee: Auburn Gear, Inc., Auburn, IN (US)

( * ) Notice: Subject to any disclaimer, the term of this patent is extended or adjusted under 35 U.S.C. 154(b) by 0 days.

(21) Appl. No.: 09/447,410

(22) Filed: Nov. 23, 1999

(51) Int. Cl.$^7$ .............................. F16H 48/08; F16H 48/30
(52) U.S. Cl. ........................ 475/230; 475/150; 475/231; 475/234
(58) Field of Search .................................. 475/231, 234, 475/235, 237, 238, 239, 240, 241, 246, 230, 150

(56) References Cited

U.S. PATENT DOCUMENTS

| | | | |
|---|---|---|---|
| 2,209,966 | | 8/1940 | Goeller ................................. 475/233 |
| 3,027,781 | | 4/1962 | O'Brien ................................ 475/231 |
| 3,053,114 | | 9/1962 | Singer .................................. 475/234 |
| 3,448,636 | * | 6/1969 | Roper et al. ......................... 475/240 |
| 3,893,351 | * | 7/1975 | Baremor ........................... 475/234 X |
| 3,964,346 | * | 6/1976 | Myers, Sr. ........................... 475/234 |
| 4,269,086 | | 5/1981 | Altmann .............................. 475/231 |
| 4,363,248 | * | 12/1982 | Brisabois ............................. 475/230 |
| 4,467,672 | * | 8/1984 | Lamy ................................... 475/246 |
| 4,722,244 | * | 2/1988 | Tsuchiya et al. .................... 475/230 |
| 4,901,599 | * | 2/1990 | Irwin ................................... 475/230 |
| 5,741,199 | * | 4/1998 | Tanser et al. ........................ 475/235 |
| 5,911,643 | * | 6/1999 | Godlew et al. ...................... 475/150 |

* cited by examiner

*Primary Examiner*—Charles A Marmor
*Assistant Examiner*—Ankur Parekh
(74) *Attorney, Agent, or Firm*—Baker & Daniels

(57) ABSTRACT

A differential assembly including a casing which rotates about a first axis, the casing having an internal cavity; an elongate cylindrical cross pin which rotates with the casing about the first axis, the cross pin extending along a second axis through the cavity, the second axis substantially perpendicular to the first axis; at least one pinion gear disposed within the cavity and about the cross pin, the pinion gear rotatable about the second axis; and a pair of side gears disposed within the cavity and in meshed engagement with the pinion gear, the side gears rotatable about the first axis. A cross pin retention element is disposed about the cross pin. The cross pin and the retention element are fixed against substantial relative movement therebetween along the second axis, and the retention element is disposed adjacent the pinion gear. The movement of the retention element relative to the casing along the second axis is restricted, whereby the cross pin is retained in the casing.

34 Claims, 12 Drawing Sheets

FIG_1
PRIOR ART

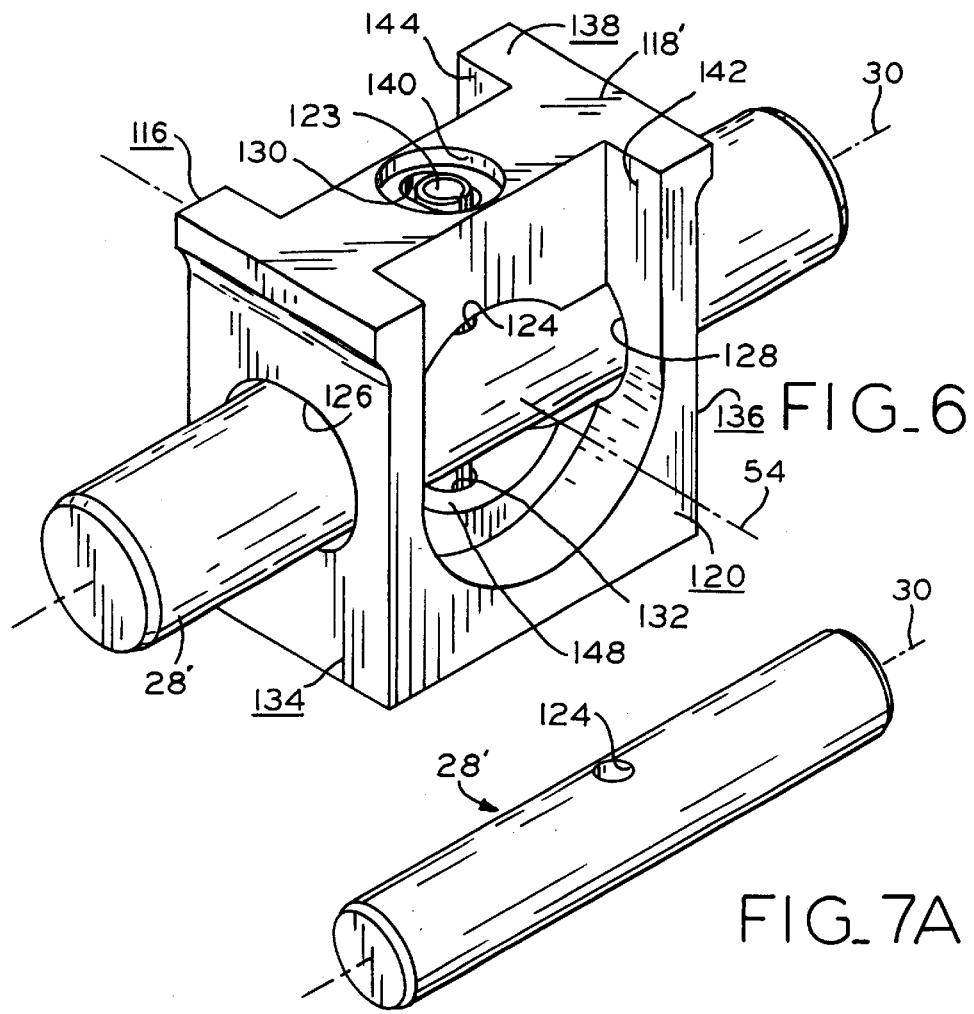
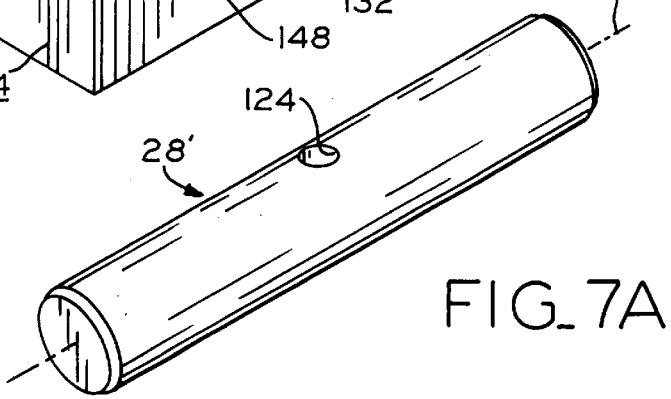
FIG. 7A
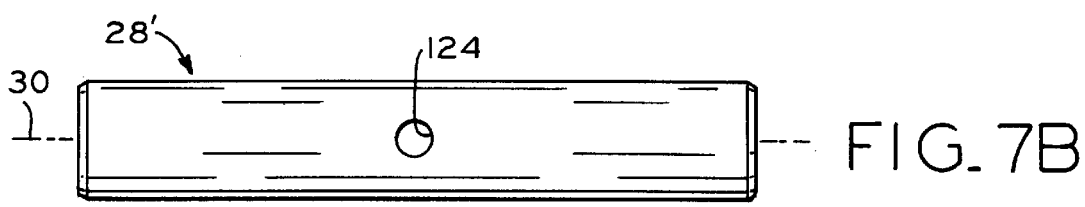
FIG. 7B
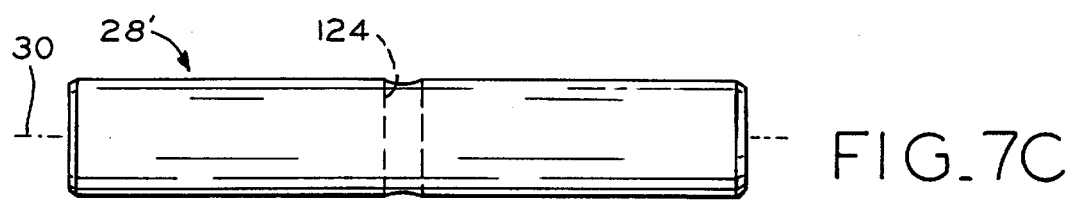
FIG. 7C
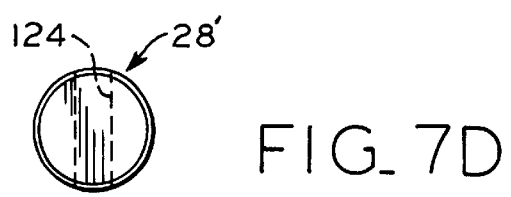
FIG. 7D

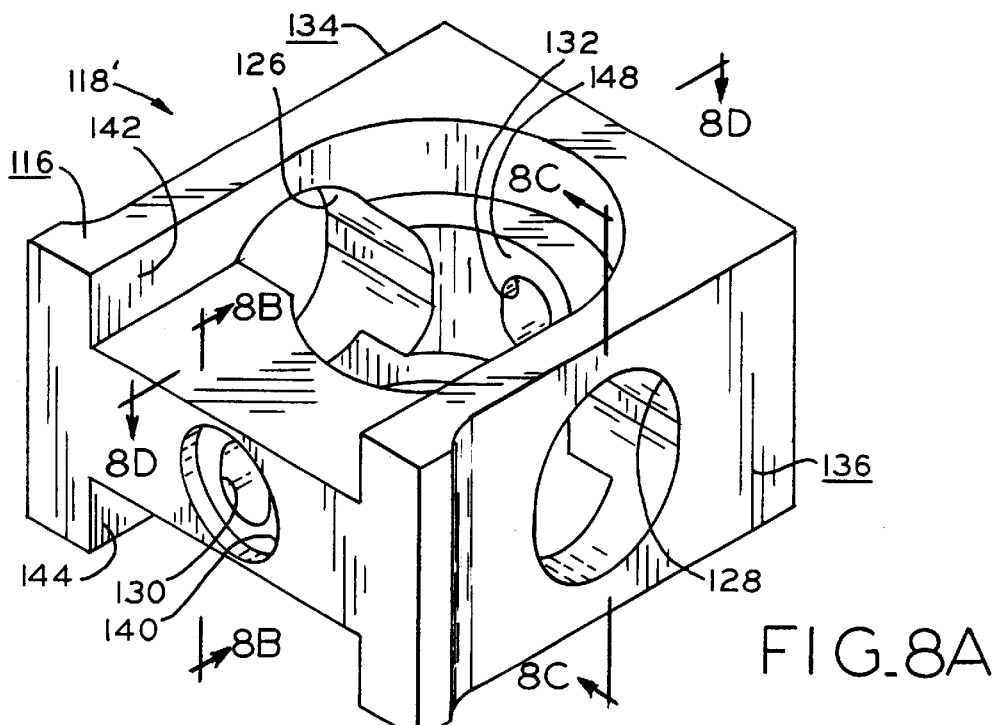
FIG_8A
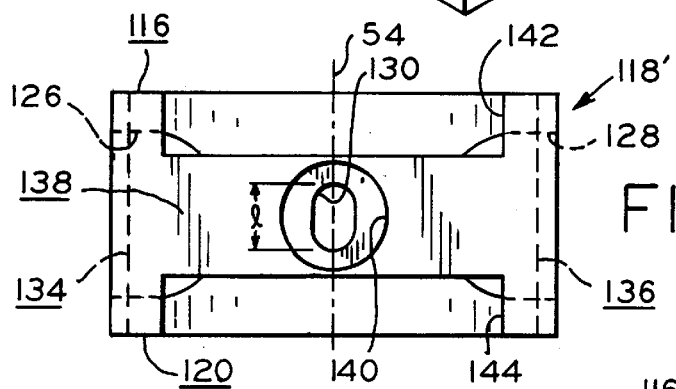
FIG_8B
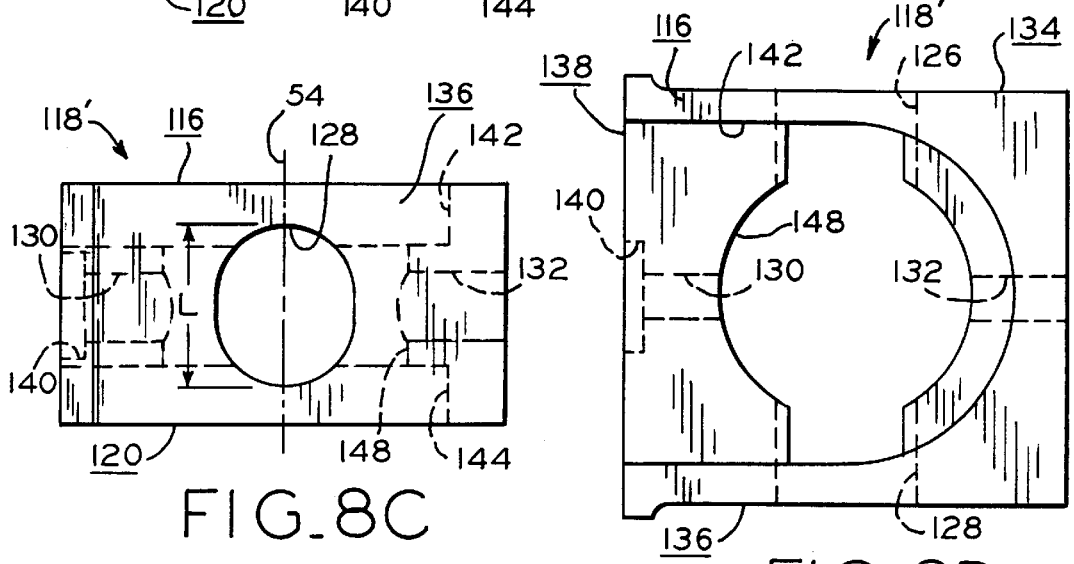
FIG_8C
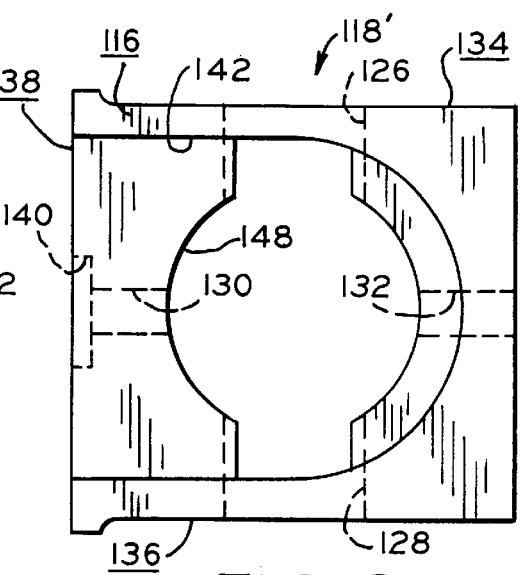
FIG_8D

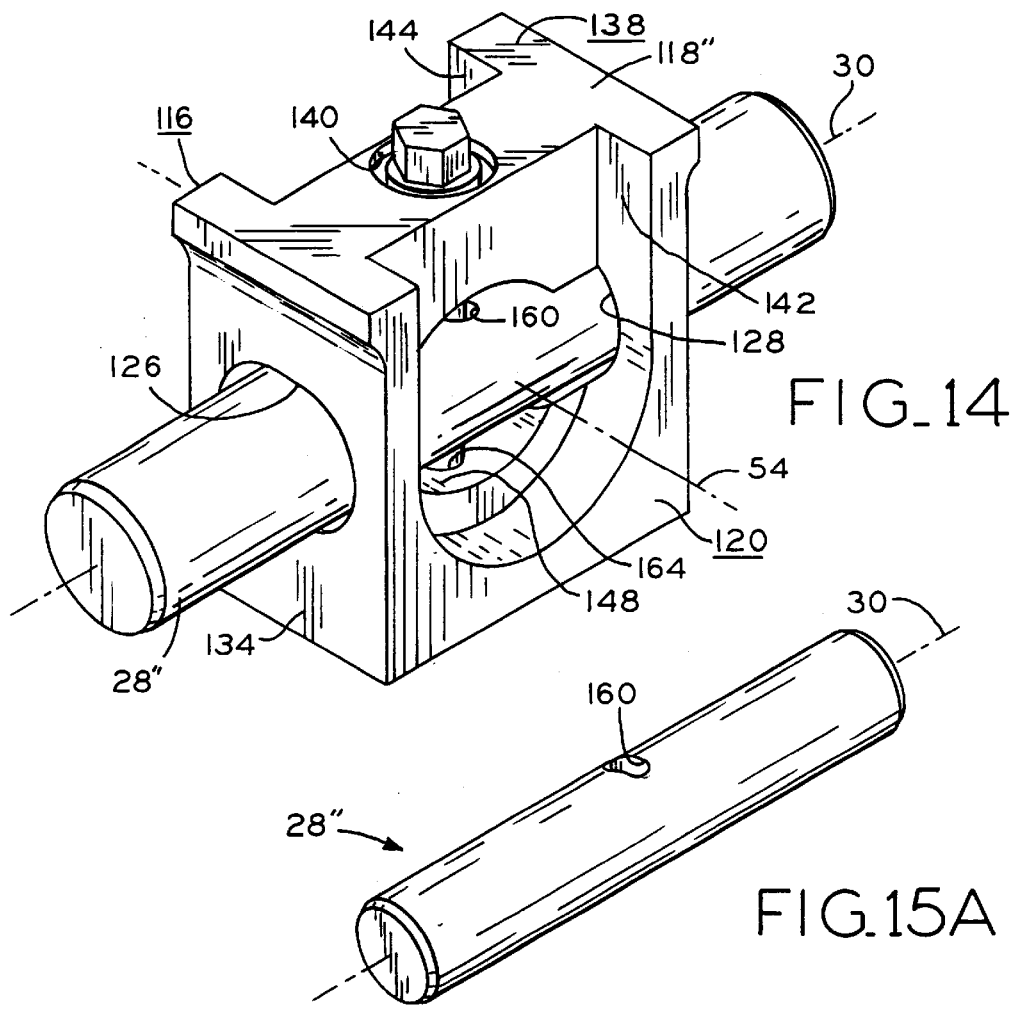
FIG. 14
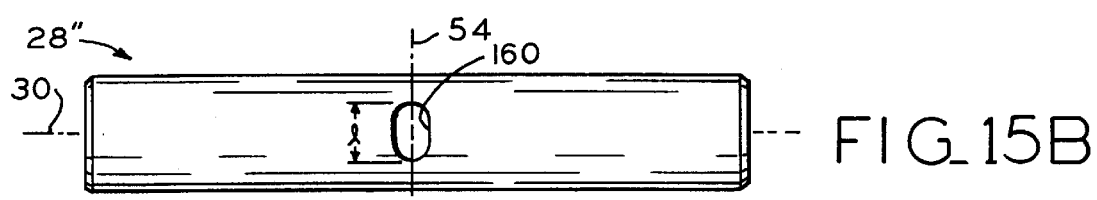
FIG. 15A
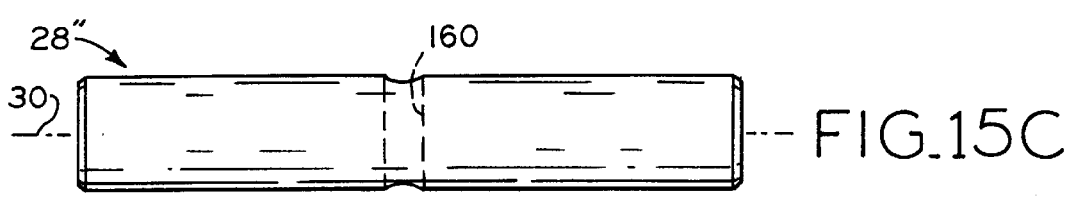
FIG. 15B
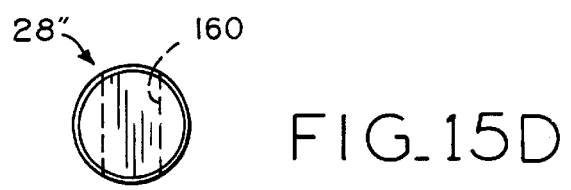
FIG. 15C
FIG. 15D

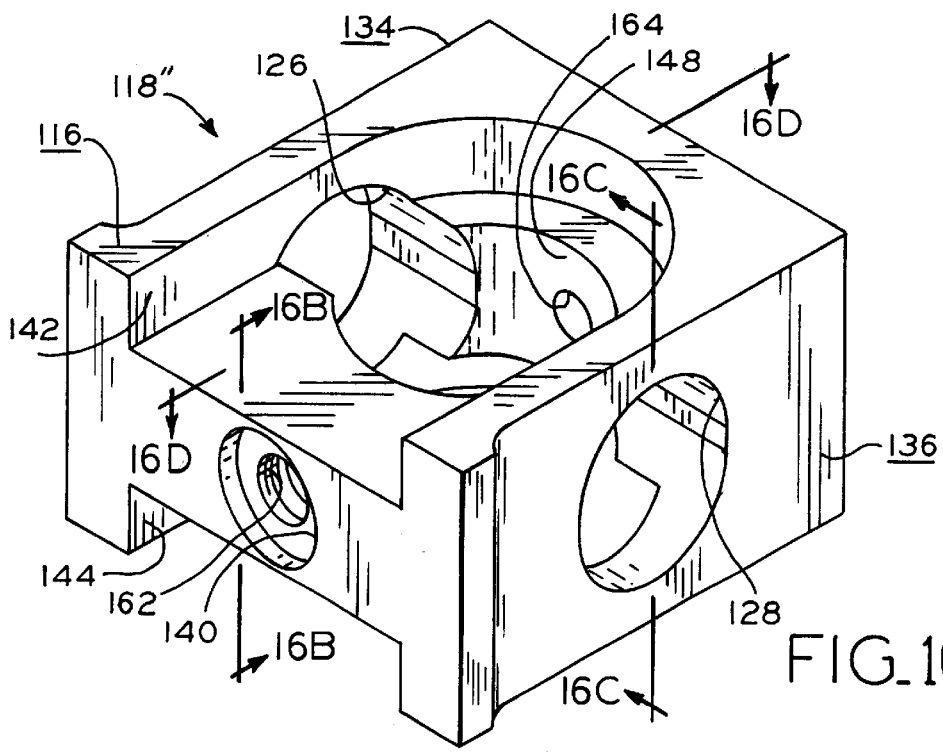
FIG_16A
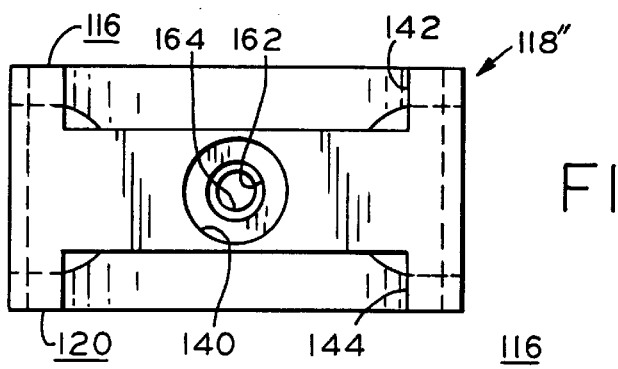
FIG_16B
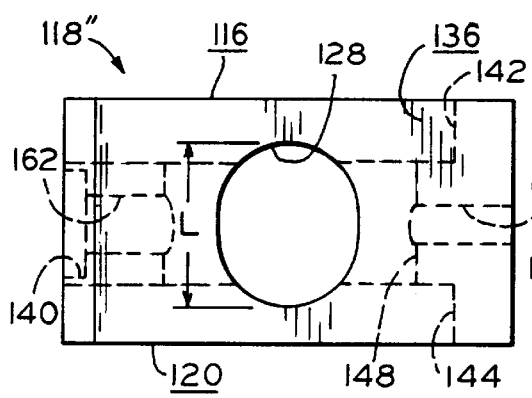
FIG_16C
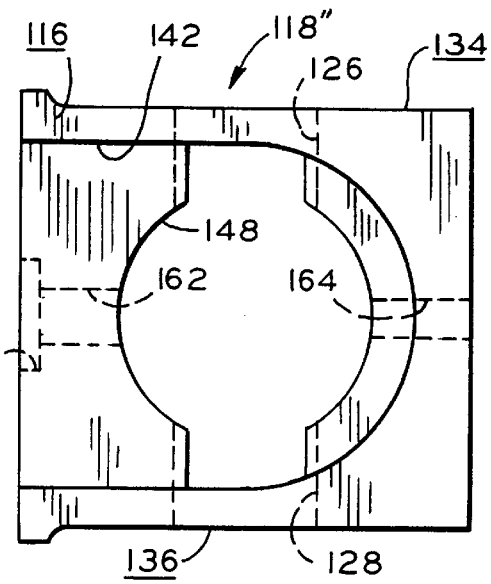
FIG_16D

DIFFERENTIAL CROSS PIN RETENTION

BACKGROUND OF THE INVENTION

The present invention relates to differentials, and more particularly, to the retention of the cross pin, on which pinion gears are rotatably disposed, therein.

Differentials are well known in the prior art and allow each of a pair of output shafts or axles operatively coupled to a rotating input shaft to rotate at different speeds, thereby allowing the wheel associated with each output shaft to maintain traction with the road while the vehicle is turning. Typically, each of the axles is rotatably fixed to one of a pair of side gears, which are both intermeshed with a pair of first pinion gears. These pinion gears are rotatably disposed about opposite ends of a cylindrical cross pin which extends through diametrically opposite, holes in the circumferential wall of the rotating differential casing. The cross pin is fixed to the casing such that the first pinion gears revolve about the axis of rotation of the axles and side gears with the casing. As will be discussed further hereinbelow, typically, one end of the cross pin is provided with a cross bore which is aligned with holes in the casing; a bolt extends through the casing holes and the cross bore to retain the cross pin to the casing.

The casing is typically provided with a ring gear attached about its outer periphery, and which is intermeshed with a second pinion gear which is drivingly rotated by an engine. The cross pin, which is caused to rotate with the casing, imparts a driving force on the first pinion gears, the teeth of which impart a driving force on the teeth of the side gears intermeshed therewith. Hence, rotation of the axles, which are coupled to each other through the side gears and first pinion gears, is achieved. During differentiation, there is relative movement between the first pinion gears and the side gears, and the axles rotate at different speeds. Thus, a differential distributes the torque provided by the input shaft between the two axles and their respective driven wheels.

The completely open differential, i.e., a differential without clutches or springs which restrict relative rotation between the axles and the rotating differential casing, is not well suited to slippery conditions in which one driven wheel experiences a much lower coefficient of friction than the other driven wheel: for instance, when one wheel of a vehicle is located on a patch of ice and the other wheel is on dry pavement. Under such conditions, the wheel experiencing the lower coefficient of friction loses traction and a small amount of torque to that wheel will cause a "spin out" of that wheel. Since the maximum amount of torque which can be developed on the wheel with traction is equal to torque on the wheel without traction, i.e. the slipping wheel, the engine is unable to develop any torque and the wheel with traction is unable to rotate. A number of methods have been developed to limit wheel slippage under such conditions.

Prior means for limiting slippage between the axles and the differential casing use a frictional clutch mechanism, either clutch plates or a frustoconical engagement structure, operatively located between the rotating case and the axles. Certain embodiments of such prior means provide a clutch element attached to each of the side gears, and which frictionally engages a mating clutch element attached to the rotating casing or, if the clutch is of the conical variety, a complementary interior surface of the casing itself. Such embodiments may also include a bias mechanism, usually a spring, to apply an initial preload between the clutch and the differential casing. By using a frictional clutch with an initial preload, a minimum amount of torque can always be applied to a wheel having traction, e.g., a wheel located on dry pavement. The initial torque generates gear separating forces between the first pinion gears and the side gears intermeshed therewith. The gear separating forces urge the two side gears outward, away from each other, causing the clutch to lightly engage and develop additional torque at the driven wheels. Examples of such limited slip differentials which comprise cone clutches are disclosed in U.S. Pat. Nos. 4,612,825 (Engle), 5,226,861 (Engle), 5,556,344 (Fox), and 5,989,147 (Forrest et al.), issued Nov. 23, 1999, all of which are assigned to the assignee of the present invention and expressly incorporated herein by reference.

Certain prior art limited slip differentials provide, between the first of the two side gears and its associated clutch element, interacting camming portions having ramp surfaces. In response to an initiating force, this clutch element is moved towards and into contact with the surface against which it frictionally engages, which may be a mating clutch element attached to the casing, or an interior surface of the casing itself, as the case may be, thereby axially separating the clutch element and its adjacent first side gear, the ramp surfaces of their interacting camming portions slidably engaging, the rotational speed of the clutch element beginning to match that of the differential casing due to the frictional engagement. Relative rotational movement between the ramp surfaces induces further axial separation of the clutch element and the first side gear. Because the clutch element is already in abutting contact with the surface against which it frictionally engages, the first side gear is forced axially away from the clutch element by the camming portions.

A transfer block element disposed about the cross pin, between the pinion gears disposed thereon, is provided to transfer axial movement from the first side gear to the second side gear, which is disposed on the opposite side of the cross pin. The transfer block element is allowed to move laterally relative to the cross pin, along the axis of the axles. The transfer block element is abutted by the axially moving first side gear and is forced into abutment with the second side gear, to which is rotatably fixed a second clutch element which also operatively engages the rotating casing, thereby providing additional clutched engagement between the clutch elements and the casing. The following example, which describes a previous limited slip differential having first and second cone clutches and an electromagnetic initiating force, is illustrative:

FIG. 1 depicts differential 10 which comprises rotatable casing 12 constructed of joined first and second casing parts 12a and 12b, respectively, and providing inner cavity 14, which is defined by the interior surface of the circumferential wall portion of first casing part 12a and end wall portions 16, 18 of first and second casing parts 12a, 12b, respectively. Disposed within cavity 14 are side gears 20, 22 and pinion gears 24, 26. The teeth of the side gears and pinion gears are intermeshed, as shown. Pinion gears 24, 26 are rotatably disposed upon cylindrical cross pin 28, which extends along axis 30. Cross pin 28 is made of a suitable material such as, for example, heat treated 8620 steel. The ends of cross pin 28 are received in holes 32, 34 diametrically located in the circumferential wall of casing part 12a. One end of cross pin 28 is provided with cross bore 36, which is aligned with holes 38, 40 in casing part 12a, as shown. Bolt 42 extends through hole 38, cross bore 36 and hole 40 to retain the cross pin in its proper position relative to casing 12. Portion 44 of bolt 42 is provided with threads which are engaged with hole 38.

Axles 46, 48 are received through hubs 50, 52, respectively formed in casing end wall portions 16, 18, along common axis of rotation 54, which intersects and is perpendicular to axis 30. Axles 46, 48 are respectively provided with splined portions 56, 58, which are received in splines 60, 62 of side gears 20, 22, thereby rotatably fixing the side gears to the axles. The axles are provided with circumferential grooves 64, 66 in which are disposed C-rings 68, 70, which prevent the axles from being removed axially from their associated side gears. Casing part 12a is provided with a large aperture (not shown) located in the circumferential wall thereof, between holes 32, 34, for assembly and service access to C-rings 68, 70. Terminal ends 72, 74 of the axles may abut against the cylindrical surface of cross pin 28, thereby restricting the axles' movement toward each other along axis 54.

Clutch element 76 is attached to side gear 20 and rotates therewith. Clutch element 76 is of the cone clutch variety and has frustoconical surface 78 which is adjacent to, and clutchedly interfaces with, complementary surface 80 provided on the interior of casing part 12a. Clutch element 82 is also of the cone clutch variety and has frustoconical surface 84 which is adjacent to, and clutchedly interfaces with, complementary surface 86 also provided on the interior of casing part 12a. Clutch element 82 is provided with annular surface 88 which faces annular surface 90 of side gear 22. Surface 88 is provided with a plurality of circumferentially-aligned arcuate grooves 92. Grooves 92 are provided with surfaces which ramp "upwards" toward surface 88 one circumferential direction along the groove. Similarly, surface 90 is provided with an equal plurality of circumferentially-aligned arcuate grooves 94 having surfaces which ramp "upwards" toward surface 90, but in an opposite circumferential direction. Disposed in each opposed pair of grooves 92, 94 is ball 96. Hence, grooves 92, 94 and balls 96 comprise a type of interacting camming mechanism well-known in the art as a ball ramp arrangement. Briefly, relative rotation between clutch element 82 and side gear 22 imparts axial separation therebetween as balls 96 ride up on the ramp surfaces of grooves 92 and 94. Alternatively, a surfaces 88, 90 may be provided with interacting cam surfaces (not shown) which project therefrom and have slidably engaging ramp surfaces which axially separate clutch element 82 and side gear 22 as they rotate relative to one another; this type of camming mechanism, too, is well known in the art. Balls 96 are urged into the deepest portions of grooves 92, 94, and surfaces 88, 90 brought into their closest proximity to each other, by means of Belleville spring 98, which is disposed between surface 100 of clutch element 82 and snap ring 102 received in circumferential groove 104 provided in portion 106 of side gear 22.

Provided on the exterior surface of casing part 12a is flange 108, to which a ring gear (not shown) is attached. The teeth of the ring gear are in meshed engagement with the teeth of a pinion gear (not shown) which is rotatably driven by an engine (not shown), thus rotating differential case 12 within an axle housing (not shown) from which axles 46, 48 project. As casing 12 rotates, the sides of holes 32, 34 bear against the portions of the cylindrical surface of cross pin 28 in the holes. The rotation of cross pin 28 about axis 54 causes pinion gears 24, 26 to revolve about axis 54. The revolution of the pinion gears about axis 54 causes side gears 20, 22 to rotate about axis 54, thus causing at least one of axles 46, 48 to rotate about axis 54.

Electromagnet 110 is rotatably fixed relative to the axle housing (not shown) in which differential 10 is disposed, and is supported on casing portion 12b by bearing 112. The voltage applied to electromagnet 110 may be controlled by a control system (not shown) which is in communication with sensors (not shown) which indicate excessive relative rotation between axles 46, 48. Electromagnet 110 is disposed in close proximity to casing 12, which rotates relative thereto. As the electromagnet is energized, an initiating force is applied to clutch element 82 by a toroidal electromagnetic flux path (not shown) which is established about the annular electromagnet; the flux path flows through ferrous casing portions 12a and 12b and through clutch element 82. Clutch element 82 is thus magnetically drawn into engagement with the casing during operation of the electromagnet.

As shown in FIG. 1, during normal differential operation, with electromagnet 110 deactivated, surfaces 88 and 90 of clutch element 82 and side gear 22, respectively, are closely adjacent and slightly separated. Balls 96 are urged into the deepest portions of slots 92, 94 by Belleville spring 98 and by gear separation forces between side gear 22 and pinion gears 24, 26. As viewed in FIG. 1, Belleville spring 98 urges cone clutch element 82 rightward, axially away from snap ring 102, and the gear separation forces urge side gear 22 leftward, toward clutch element 82.

As electromagnet 110 is activated, further axial separation of cone clutch element 82 and side gear 22 is induced as cone clutch element 82 is magnetically pulled to the left, against the force of Belleville spring 98, into clutched engagement with casing part 12 through mating frustoconical surfaces 84, 86; side gear 22 temporarily maintains its axial position. As cone clutch element 82 and side gear 22 separate axially, balls 96 are caused to rotate along the ramping paths of slots 92, 94 due to the relative rotation between cone clutch element 82, which is in frictional engagement with the case, and side gear 22; the rotation of the balls along the slots induces yet further axial separation of cone clutch element 82 and side gear 22, the side gear urged rightward as viewed in FIG. 1, its surface 114 abutting adjacent surface 116 of transfer block element 118.

Transfer block element 118 is disposed about cross pin 28, and held in position along the cross pin by its opposite ends abutting pinion gears 24, 26. Transfer block 118 moves laterally relative to the cross pin, along axis 54, such that rightward movement of side gear 22, described above, is transferred to side gear 20. Surface 120 of transfer block 118 is brought into abutting contact with surface 122 of side gear 20. Thus, during actuation of electromagnet 110, side gear 22 is urged rightward, as viewed in FIG. 1, into abutting contact with transfer block element 118, which may be made of steel. Transfer block element 118 moves rightward, into abutting contact with side gear 20; and side gear 20 moves rightward, urging surface 78 of clutch element 76 into frictional engagement with surface 80 of case part 12a, thereby providing additional torque transfer capacity to the differential than would otherwise be provided with single cone clutch element 82.

In use, the circumferential wall of casing 12 experiences a substantial amount of stress, the entirety of the energy transferred from the engine to the axles being communicated from the rotating casing through its holes 32, 34 bearing on the cylindrical surface at opposite ends of the cross pin. In circumstances where an extraordinary amount of stress is exerted on casing 12, damage thereto may occur. As mentioned above, cross pin 28 is secured to casing part 12a by removable, partially threaded bolt 42 which extends into aligned holes 38, 40 in casing part 12a. Holes such as holes 38, 40, placed near the interface of the casing and the cross pin may compromise the strength of the casing. Further, cross bore 36, which extends through one end of cross pin 28, may compromise the strength of the cross pin. It is desirable to eliminate holes such as 38, 40, in the casing wall, and cross bores such as 36 in the ends of the cross pin, which are subject to high shear stresses.

Further, in particular circumstances, bolt 42 may back out of its threaded engagement in casing hole 38, and fall out of casing holes 38, 40 and cross pin cross bore 36, causing cross pin 28 to dislodge from its position within aligned bores 32, 34 in casing part 12a, resulting in complete failure of the differential mechanism. Such a failure renders the vehicle in which differential 10 is installed inoperable. Bolt 42 may be caused to back out of its threaded engagement by continuous vibrations or strains placed on the casing forces during normal operation of differential 10. A more effective means of retaining the cross pin in aligned bores 32, 34 is thus desirable.

Bolt 42 is also disposed in a somewhat inconvenient location for service purposes which require removal of the cross pin while the differential is installed in the axle housing. Because bolt 42 is rather long and is disposed such that it must be removed along a line parallel with axis 54, access to and removal of the bolt while the differential is installed in the axle housing may be hindered. A more accessible means of detachably securing the cross pin to the differential is therefore desirable.

Thus, what is needed is a means of retaining the cross pin of a limited slip differential which provides greater casing strength and easier accessibility to the fastener which retains the cross pin to the casing.

SUMMARY OF THE INVENTION

The present invention provides a differential assembly including a casing which rotates about a first axis, the casing having an internal cavity; an elongate cylindrical cross pin which rotates with the casing about the first axis, the cross pin extending along a second axis through the cavity, the second axis substantially perpendicular to the first axis; at least one pinion gear disposed within the cavity and about the cross pin, the pinion gear rotatable about the second axis; and a pair of side gears disposed within the cavity and in meshed engagement with the pinion gear, the side gears rotatable about the first axis. A cross pin retention element is disposed about the cross pin. The cross pin and the retention element are fixed against substantial relative movement therebetween along the second axis, and the retention element is disposed adjacent the pinion gear. The movement of the retention element relative to the casing along the second axis is restricted, whereby the cross pin is retained in the casing. An embodiment of the inventive differential may be of the limited slip variety, in which the cross pin retention element serves as a transfer block which moves laterally relative to the cross pin.

The present invention also provides a differential assembly including a casing rotatable about a first axis; an elongate cylindrical cross pin fixed to the casing, the cross pin extending through the casing along a second axis substantially perpendicular to the first axis, the cross pin having a hole extending laterally therethrough; a pinion gear disposed within the casing and rotatably disposed upon the cross pin, the pinion gear revolving about the first axis; a pair of side gears intermeshed with the pinion gear; a cross pin retention element disposed about the cross pin, the retention element provided with a hole aligned with the lateral cross pin hole, the retention element disposed adjacent the pinion gear and between the side gears; and a fastener extending through the aligned retention element and cross pin holes, whereby the retention element and the cross pin are attached to each other. The cross pin is supported along the second axis within the casing by the engagement of the fastener with the retention element and cross pin holes. An embodiment of the inventive differential may be of the limited slip variety, in which the cross pin retention element serves as a transfer block which moves laterally relative to the cross pin.

BRIEF DESCRIPTION OF THE DRAWINGS

The above mentioned and other features and objects of this invention, and the manner of attaining them, will become more apparent and the invention itself will be better understood by reference to the following description of the embodiments of the invention taken in conjunction with the accompanying drawings, wherein:

FIG. 6 is a perspective view of the transfer block element and cross pin assembly of the differential of FIG. 2;

FIG. 7A is a perspective view of the cross pin of FIG. 6;

FIG. 7B is a top view of the cross pin of FIG. 7A;

FIG. 7C is a side view of the cross pin of FIG. 7A;

FIG. 7D is an end view of the cross pin of FIG. 7A;

FIG. 8A is a perspective view of the transfer block element of FIG. 6;

FIG. 8B is a top view of the transfer block element of FIG. 8A in the direction of line 8B—8B;

FIG. 8C is an end view of the transfer block element of FIG. 8A in the direction of line 8C—8C;

FIG. 8D is a side view of the transfer block element of FIG. 8A in the direction of line 8D—8D;

FIG. 14 is a perspective view of the transfer block element and cross pin assembly of the differential of FIG. 10;

FIG. 15A is a perspective view of the cross pin of FIG. 14;

FIG. 15B is a top view of the cross pin of FIG. 14;

FIG. 15C is a side view of the cross pin of FIG. 14;

FIG. 15D is an end view of the cross pin of FIG. 14;

FIG. 16A is a perspective view of the transfer block element of FIG. 14;

FIG. 16B is a top view of the transfer block element of FIG. 16A in the direction of line 16B—16B;

FIG. 16C is an end view of the transfer block element of FIG. 16A in the direction of line 16C—16C;

FIG. 16D is a side view of the transfer block element of FIG. 16A in the direction of line 16D—16D.

Figure 1:
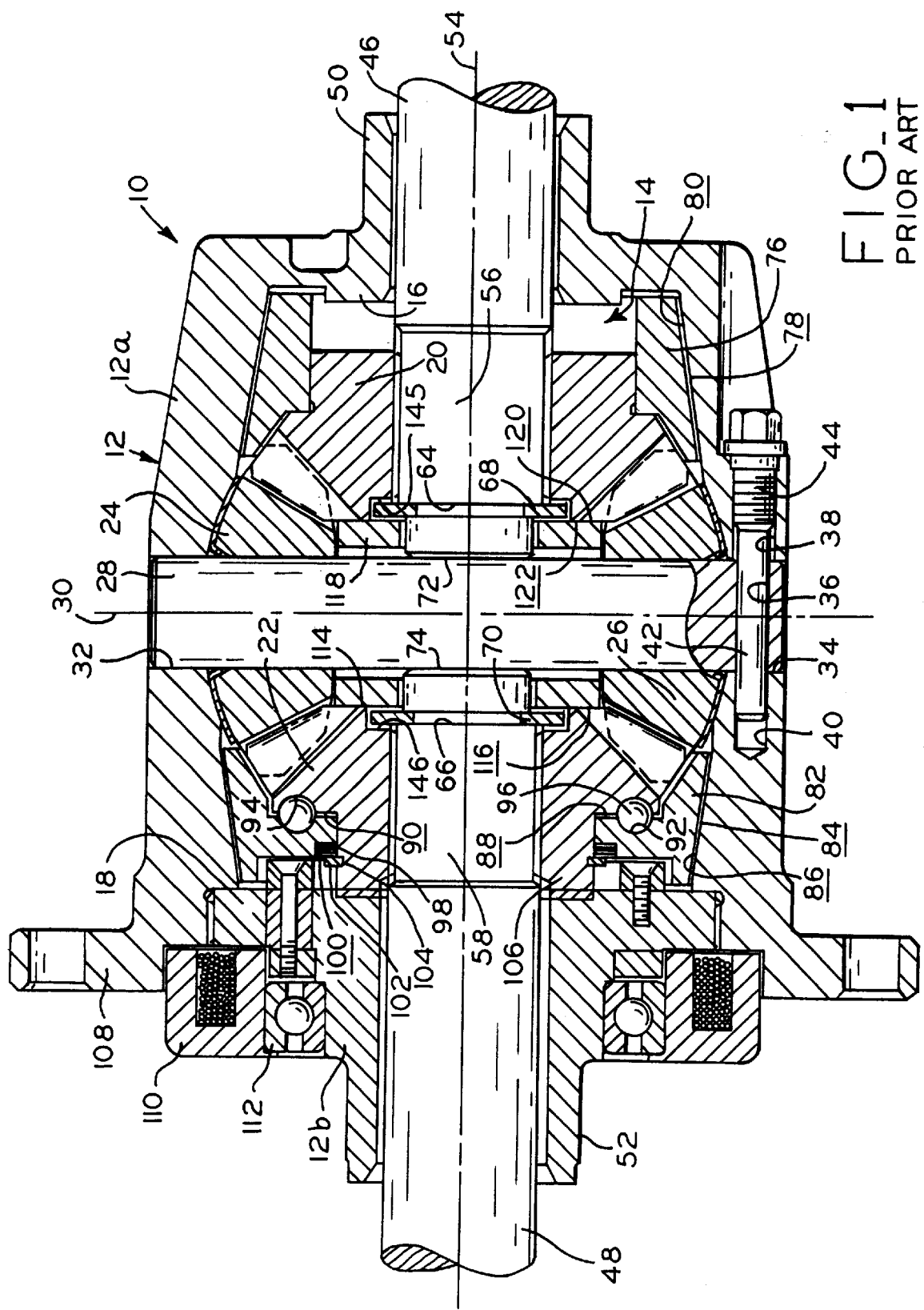
FIG. 1 is a sectional side view of one embodiment of a prior art differential having its cross pin retained by means of a partially threaded bolt disposed through a hole formed through the differential casing and a cross bore formed in one end of the cross pin.

Corresponding reference characters indicate corresponding parts throughout the several views. Although the drawings represent embodiments of the present invention, the drawings are not necessarily to scale and certain features may be exaggerated or simplified in order to better illustrate and explain the present invention. The exemplification set out herein illustrates embodiments of the invention in several forms, and such exemplifications are not to be construed as limiting the scope of the invention in any manner.

DETAILED DESCRIPTION OF THE INVENTION

The embodiments disclosed below are not intended to be exhaustive or limit the invention to the precise forms disclosed in the following detailed description. Rather, the embodiments are chosen and described so that others skilled in the art may utilize their teachings.

Figure 2:
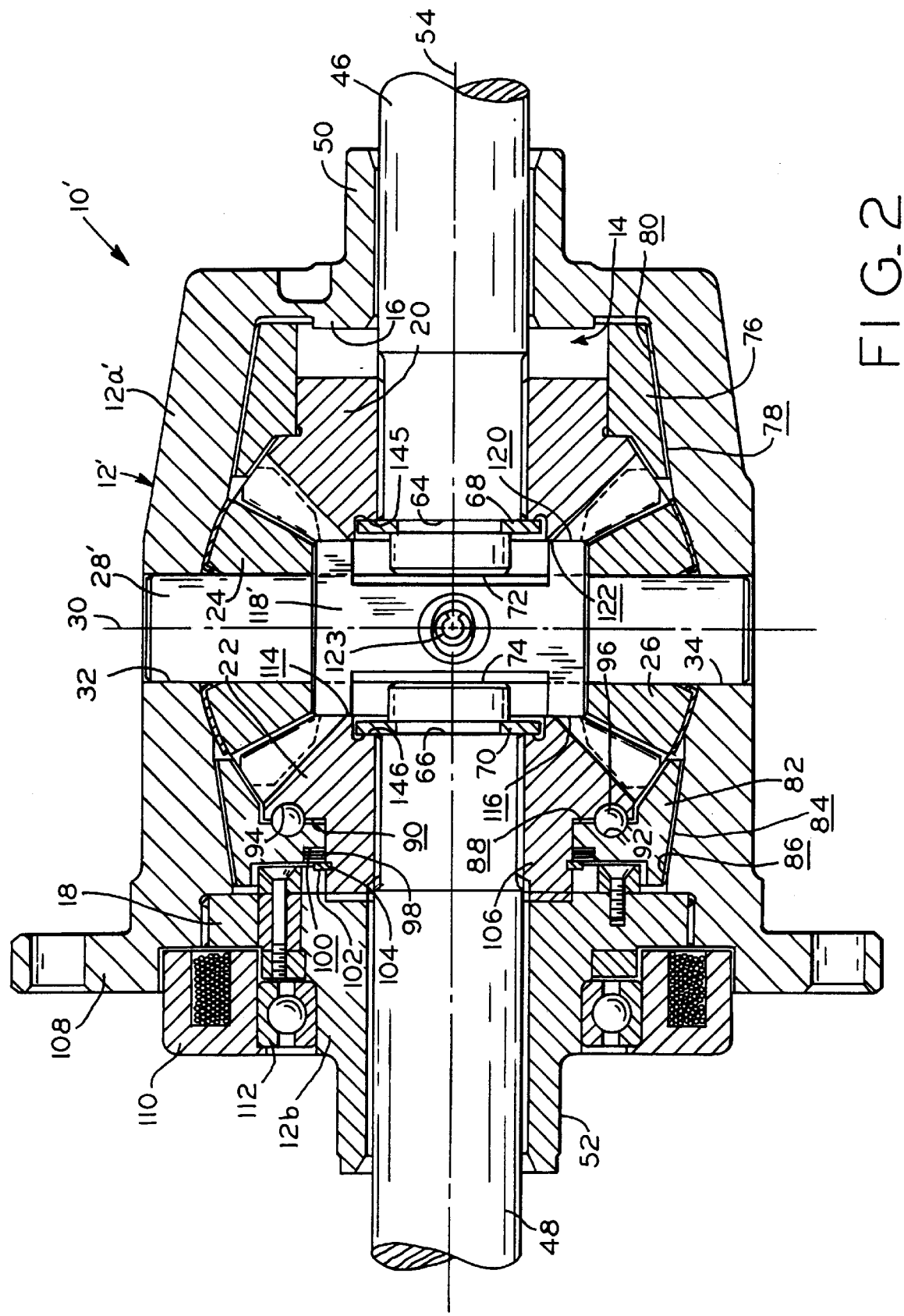
FIG. 2 is a sectional side view of a first embodiment of a limited slip differential having its cross pin retained by means of its transfer block element, in accordance with the present invention.

Referring to FIG. 2, limited slip differential assembly 10' comprises differential casing 12' which is constructed of joined casing parts 12a' and 12b, and further comprises cross pin 28' and transfer block element 118'. Differential 10' is substantially identical to differential 10, described above, except as indicated herein below.

Figure 3:
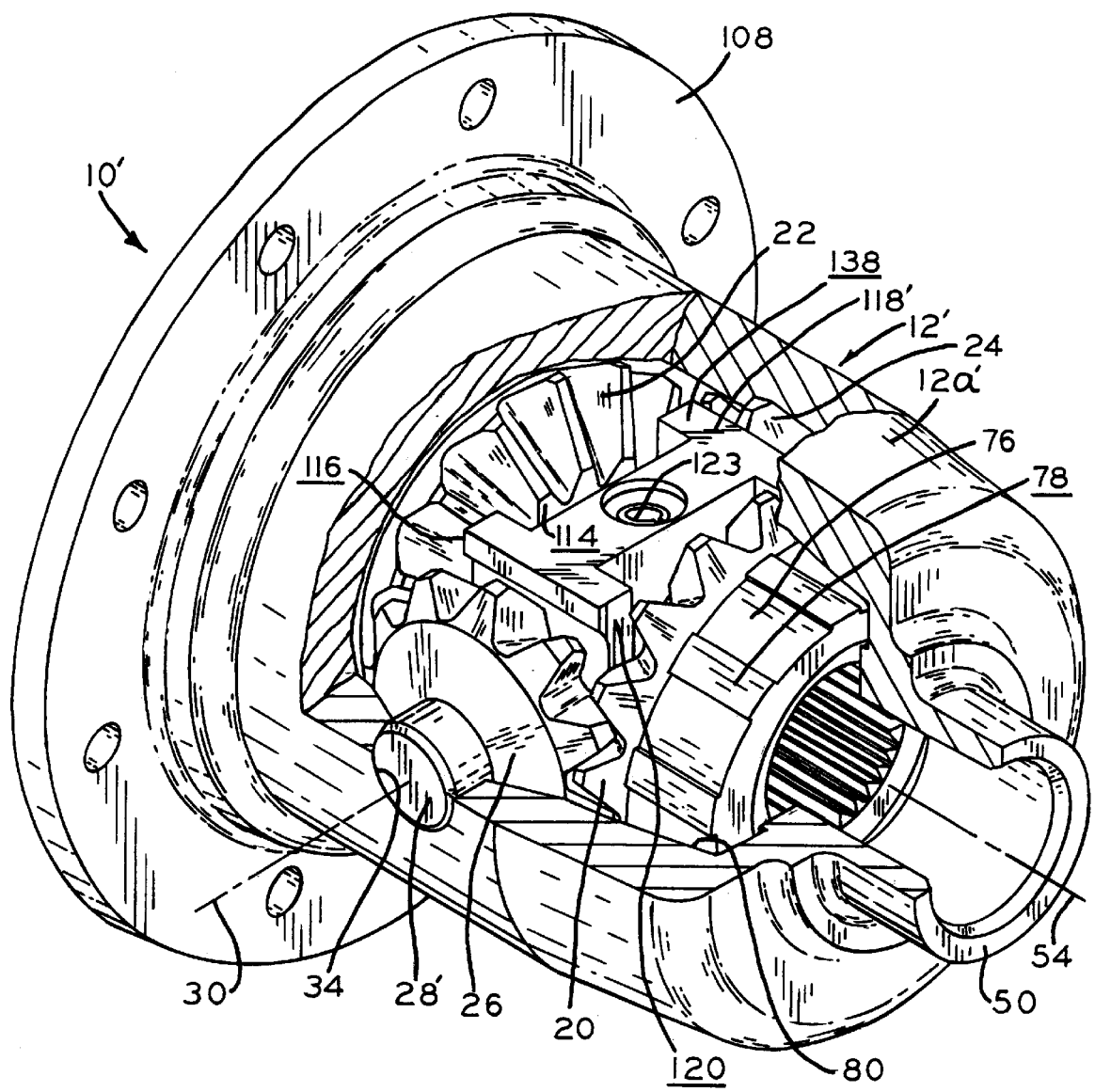
FIG. 3 is a partially-sectioned, perspective view of the differential of FIG. 2.
Figure 4:
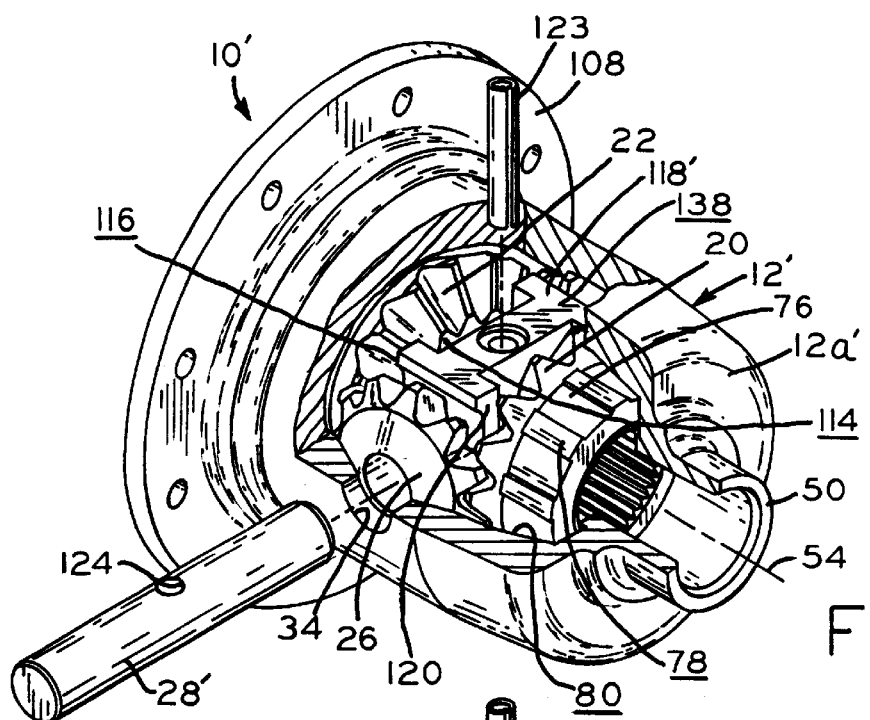
FIG. 4 is a partially exploded assembly view of the differential of FIG. 3.
Figure 5:
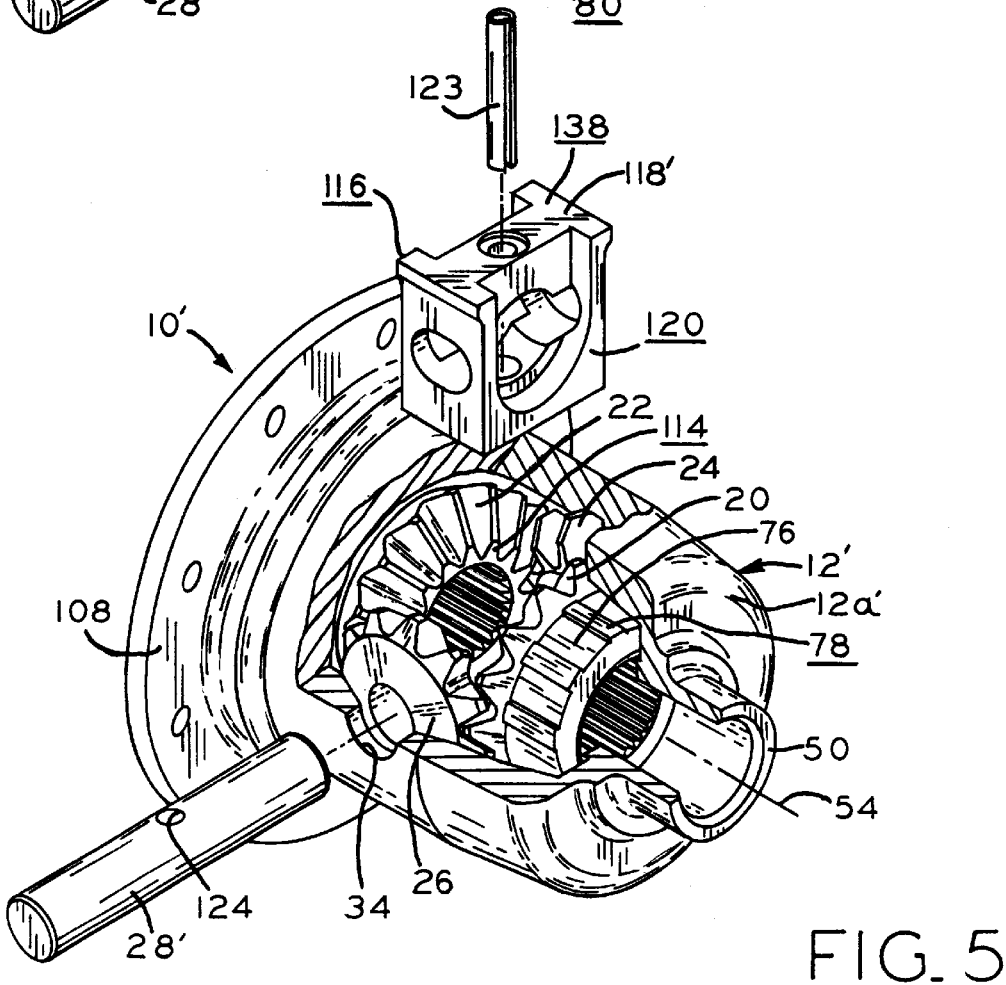
FIG. 5 is a more fully exploded assembly view of the differential of FIG. 3.
Figure 9A:
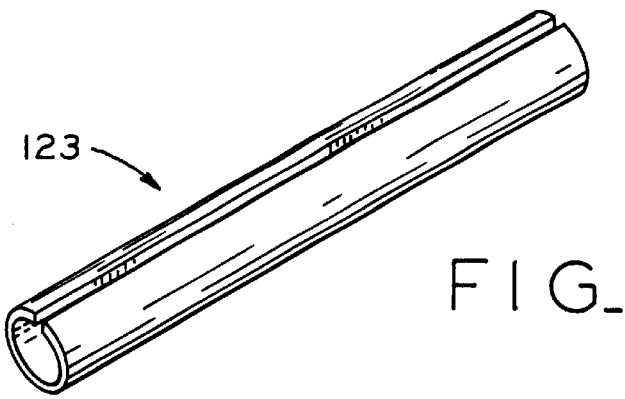
FIG. 9A is a perspective view of the spring pin of FIG. 6.
Figure 9B:
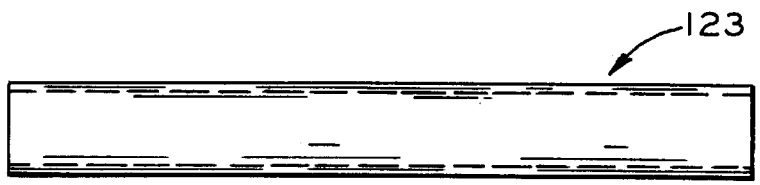
FIG. 9B is a side view of the spring pin of FIG. 9A.
Figure 9C:
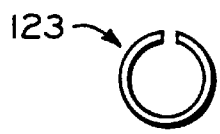
FIG. 9C is an end view of the spring pin of FIG. 9A.
Figure 17:
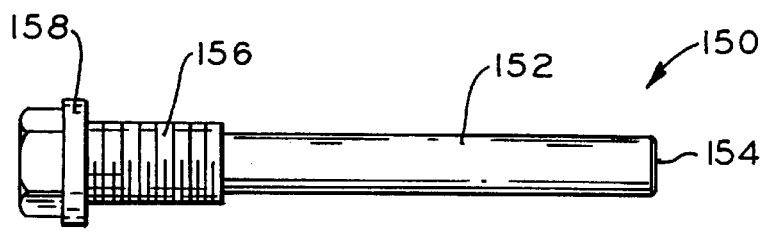
FIG. 17 is a side view of the bolt of FIG. 14.
Figure 10:
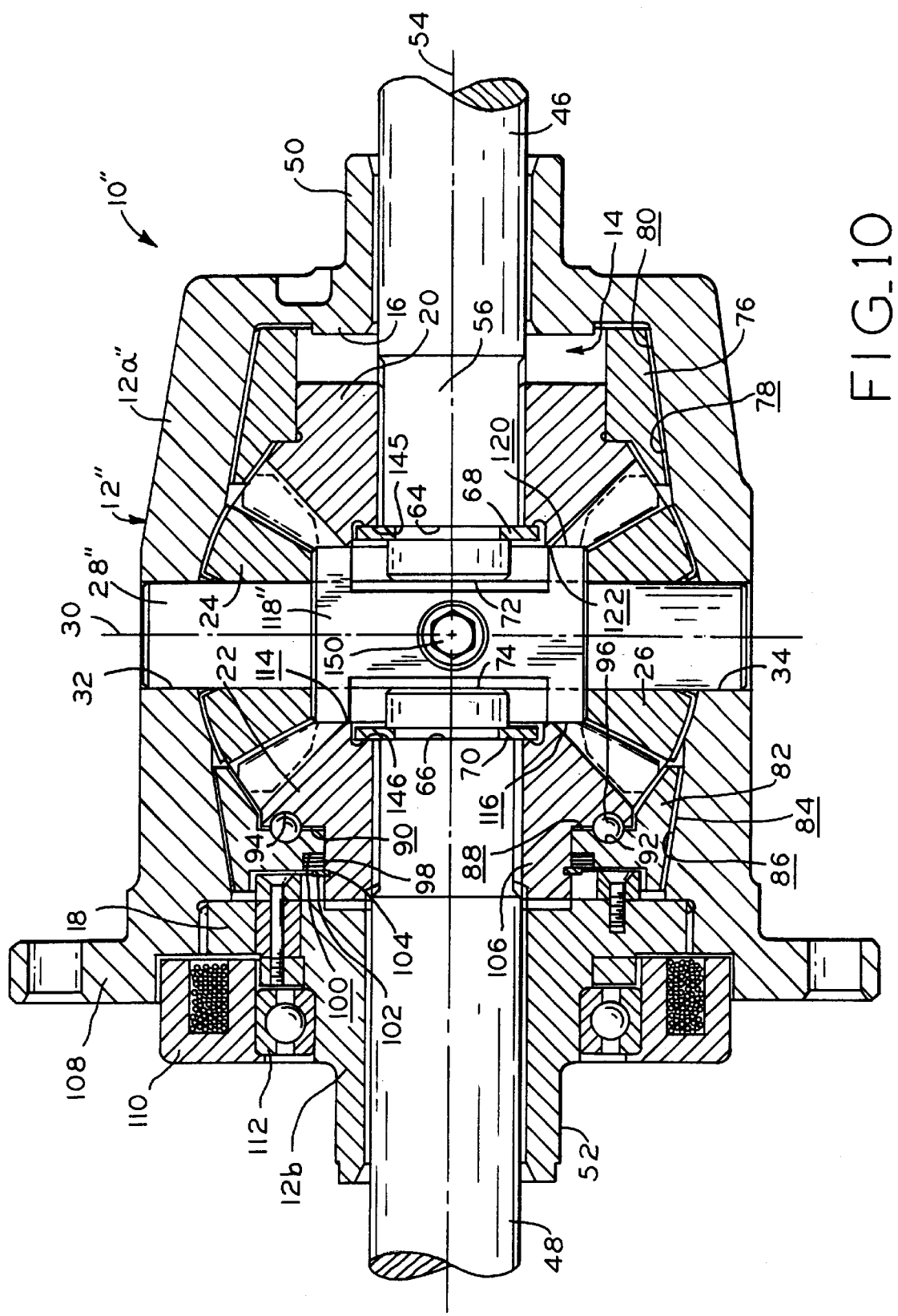
FIG. 10 is a sectional side view of a second embodiment of a limited slip differential having its cross pin retained by means of its transfer block element, in accordance with the present invention.

Referring now to FIGS. 3–5, transfer block element 118' is disposed about cross pin 28' and adapted to move laterally relative thereto along axis 54 to transfer movement of side gear 22 to side gear 20, thereby engaging clutch 76 in the same manner as described above. Notably, although cross pin 28' is disposed within aligned holes 32, 34 of casing part 12a', casing 12' is not provided with holes 38, 40, and cross pin 28' is not provided with cross bore 36 at one end thereof, and differential 10' does not rely on bolt 42 to retain the cross pin to the casing. As shown in FIG. 6, transfer block element 118' is attached directly to cross pin 28' by means of spring pin or roll pin 123. Spring pin 123 (FIG. 9), which comprises a rolled sheet of spring steel, extends through centrally-located cross bore 124 which extends perpendicularly to axis 30 through cross pin 28'. Spring pin 123 is retained in cross bore 124 by means of an interference fit. Cross pin 28' is shown FIGS. 7A–7D. Notably, as with cross pin 28, the shear loads associated with torque transmission are exerted on cross pin 28' near its opposite ends, particularly between the circumferential wall of casing part 12a' and the adjacent pinion gears 24, 26. At the longitudinal center of cross pin 28', where cross bore 124 is located, there is no substantial shear stress exerted on the cross pin. Further, vis-a-vis casing part 12a, casing part 12a' is stronger near hole 34, for there is no discontinuity in the casing caused by the provision of holes 38, 40.

As shown in FIGS. 6 and 8A–8D, like transfer block element 118, transfer block element 118' includes opposite bearing sides 116, 120 for transferring movement of side gear 22 to side gear 20, as described above, and allows terminal ends 72, 74 of axles 46, 48, respectively, to abut the cylindrical side surface of the cross pin. Lateral movement of the transfer block element relative to the cross pin is accommodated by aligned first oblong apertures 126, 128 through which the cross pin extends, the diameter of the cross pin slightly smaller than the width (i.e., in a direction perpendicular to both axes 30 and 54) of apertures 126, 128, as in differential 10. Length "L" of oblong apertures 126, 128 (FIG. 8C) extends in directions along axis 54. Spring pin 123 extends through aligned second oblong apertures 130, 132 which restrict movement of cross pin 28' along axis 30 while permitting movement of the transfer block element along axis 54, the diameter of cross bore 124, and thus of pin 123 inserted therein, somewhat smaller than the width (i.e., in a direction parallel to axis 30) of apertures 130, 132. Length "l" of apertures 130, 132 (FIG. 8B) extends in directions along axis 54. Surfaces 134, 136 of transfer block element 118' abut pinion gears 24, 26, respectively, as in differential 10, thereby restricting movement of the transfer block element, and thus the cross pin, relative to casing 12' along axis 30. Thus it will be understood that transfer block 118' serves as a cross pin retention element.

Notably, the cross pin's movement along axis 54 is restricted by the interface between cross pin 28' and the sides of first oblong apertures 126, 128. That is, the length (i.e., in a direction parallel to axis 54) of oblong first apertures 126, 128 is slightly greater than that of oblong second apertures 130, 132, and roll pin 123 experiences no substantive shear stress along the directions of axis 54. The only shear stress which pin 123 experiences is that minor amount associated with supporting the weight of cross pin 28' in the directions along axis 30, which stress will vary as casing 12' rotates from no stress, when cross pin 28' is horizontal, to a maximum stress, when cross pin 28' is vertical. Notably, surface 138 of transfer block 118' is provided with shallow counterbore 140 surrounding oblong second aperture 130. In differential 10' counterbore 140 faces a large aperture (not shown) located in the circumferential wall of casing part 12a' between holes 32, 34, for assembly and service access to spring pin 123 and C-rings 68, 70. The tip of one terminal end of spring pin 123 projects into and is exposed within counterbore 140 so that the spring pin may be grasped with a tool, such as, for example, a pair of pliers, and squeezed to a smaller diameter for installation into and removal from cross pin counterbore 124. Alternatively, pin 123 may be driven into place by tapping one end of thereof with a hammer.

Transfer block 118' is provided with U-shaped recesses 142, 144 which allow C-rings 68, 70 to be installed while transfer block 118' remains in place. This is done by removing cross pin 28' and sliding axles 46, 48 inward to that their terminal ends 72, 74 extend into central aperture 148, thereby exposing circumferential grooves 64, 66 within U-shaped recesses 142, 144. C-rings 68, 70 may then be respectively positioned in grooves 64, 66. Once C-rings 68, 70 are in place in grooves 64, 66, axles 46, 48 are pulled outwardly until the C-rings are respectively seated into counterbores 145, 146 provided in side gears 20, 22. Cross pin 28' is then installed, the inward motion of the axles restricted by their terminal ends 72, 74 being in abutment with the axially-extending cylindrical surface of the cross pin. Transfer block 118' is also provided with central aperture 148 which allows terminal ends 72, 74 of the axles to abut the cylindrical side surfaces of cross pin 28'.

A second embodiment of the present invention is shown in FIGS. 10–17. Differential 10" also comprises differential casing 12' and is substantially identical to differential 10' except as indicated hereinbelow. Rather than comprising transfer block 118', cross pin 28' and spring pin 123, differential 10" instead comprises transfer block element 118", cross pin 28" and bolt 150.

Figure 11:
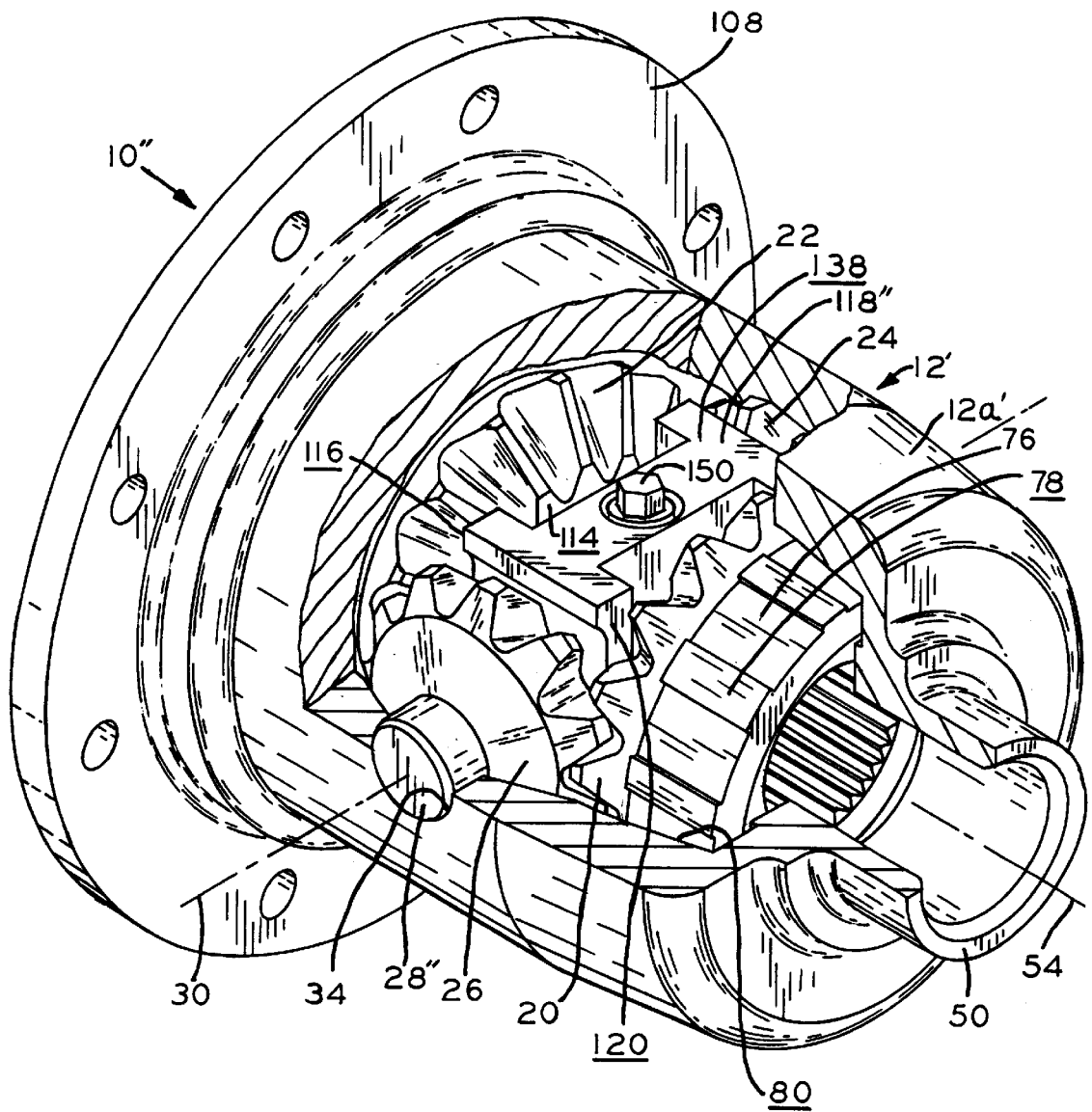
FIG. 11 is a partially-sectioned, perspective view of the differential of FIG. 10.
Figure 12:
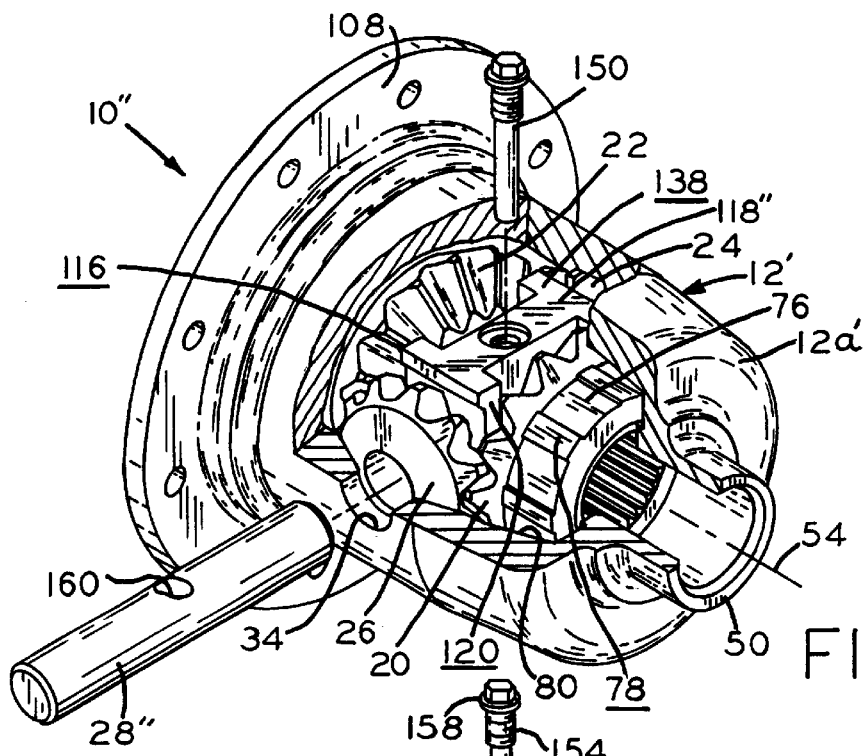
FIG. 12 is a partially exploded assembly view of the differential of FIG. 11.
Figure 13:
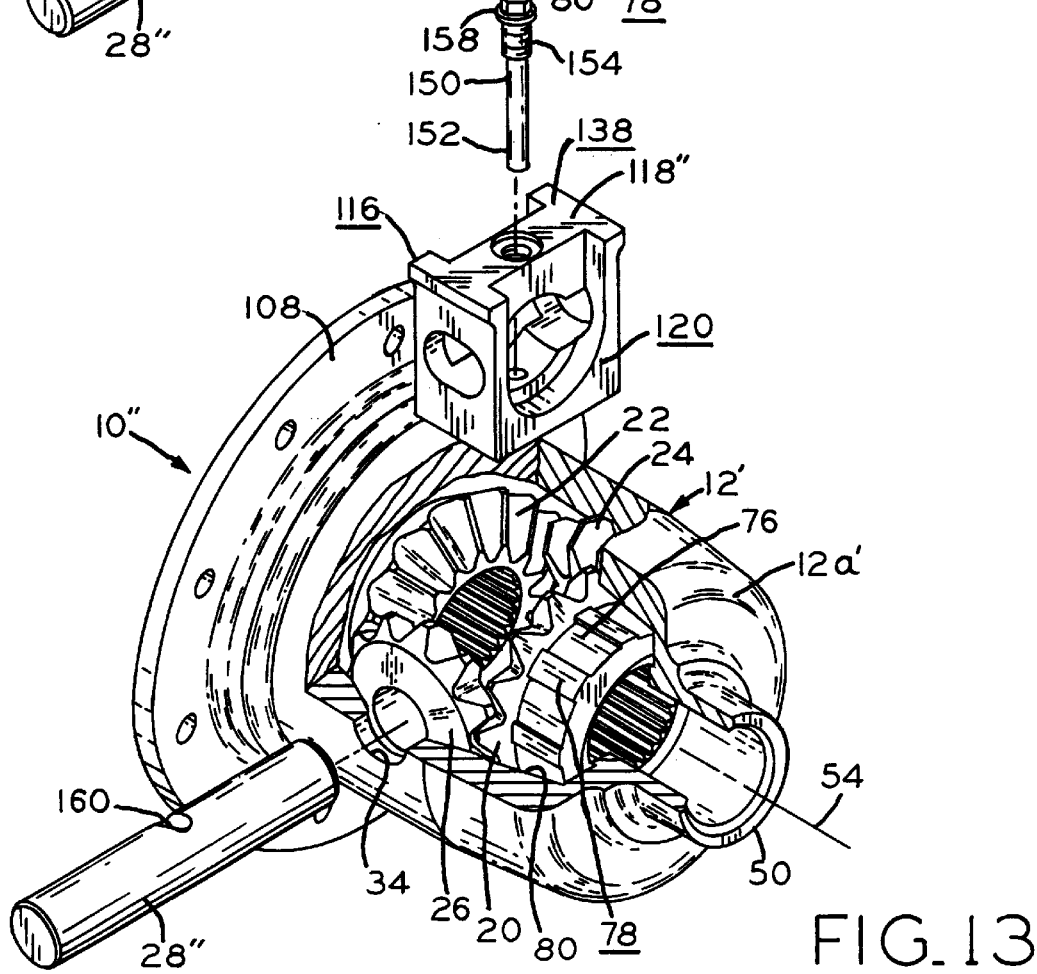
FIG. 13 is a more fully exploded assembly view of the differential of FIG. 11.

Referring now to FIGS. 11–13, transfer block element 118" is disposed about cross pin 28" and adapted to move laterally relative thereto along axis 54 to transfer movement of side gear 22 to side gear 20, thereby engaging clutch 76 in the same manner as described above. Notably, as in first embodiment differential 10', cross pin 28" is disposed within aligned holes 32, 34 of casing part 12a'; casing 12' is not provided with holes 38, 40, and cross pin 28" is not provided with cross bore 36 at one end thereof. As shown in FIG. 11, transfer block element 118" is attached directly to cross pin 28" by means of bolt 150. Bolt 150 (FIG. 17) comprises cylindrical elongate, nonthreaded portion 152 which extends between terminal end 154 and threaded portion 156. Adjacent threaded portion 156 is flanged head 158. Portion 152 of bolt 150 extends through centrally-located, oblong cross hole 160 which extends perpendicularly to axis 30 through cross pin 28". Length "l" of oblong aperture 160 (FIG. 15BB) extends in directions along axis 54. The diameter of bolt portion 152 is somewhat smaller than the width of cross hole 160, i.e., in a direction parallel to axis 30. Cross pin 28" is shown FIGS. 15A–15D. Again, as in cross pin 28', the shear loads associated with torque transmission are exerted on cross pin 28" near its opposite ends, particularly between the circumferential wall of casing part 12a' and the adjacent pinion gears 24, 26, and at the longitudinal center of cross pin 28", where cross hole 160 is located, there is no substantial shear stress exerted on the cross pin.

As shown in FIGS. 14 and 16A–16D, like transfer block 118', transfer block element 118" includes opposite bearing sides 116, 120 for transferring movement of side gear 22 to side gear 20, as described above, and allows terminal ends 72, 74 of axles 46, 48, respectively, to abut the cylindrical side surface of the cross pin. Transfer block element 118" is provided with aligned holes 162, 164, the former being threaded to received threaded portion 156 portion of bolt 150, the latter receiving the terminal end of cylindrical nonthreaded portion 152. As in first embodiment differential 10', lateral movement of the transfer block relative to the cross pin is accommodated by aligned first oblong apertures 126, 128 through which the cross pin extends. Length "L" of oblong apertures 126, 128 (FIG. 16C) extends in directions along axis 54. Bolt portion 152 extends through cross hole 160 in cross pin 28", which restrict movement of cross pin 28" along axis 30 while permitting movement of the transfer block along axis 54. Surfaces 134, 136 of transfer block element 118" abut pinion gears 24, 26, respectively, as in differential 10', thereby restricting movement of the transfer block, and thus the cross pin, relative to the casing along axis 30; transfer block 118" thus serving as a cross pin retention element. Notably, as described above, the cross pin's movement along axis 54 is restricted by the interface between cross pin 28" and the sides of first oblong apertures 126, 128; bolt 150 experiences no substantive shear stress along the directions of axis 54. The only shear stress bolt 150 experiences is that associated with supporting the weight of cross pin 28" in the directions along axis 30, which stress will vary as casing 12" rotates from no stress, when cross pin 28" is horizontal, to a maximum stress, when cross pin 28" is vertical. Notably, surface 138 of transfer block 118" is provided with shallow counterbore 140 surrounding hole 162, the flange of the bolt head received in the counterbore. In similar fashion to differential 10', counterbore 140 faces a large aperture (not shown) located in the circumferential wall of casing part 12a' between holes 32, 34, for assembly and service access to bolt head 158 and C-rings 68, 70.

Those skilled in the art will recognize that application of the above-described, inventive cross pin retention means may also be beneficially applied to open differentials. Such embodiments of the present invention (not shown) need not provide the ability to move the block element laterally relative to the cross pin along axis 54, to provide the above-mentioned advantages regarding durability and service accessibility. Rather, the block element may serve to only retain the cross pin within the casing in the manner disclosed above.

While this invention has been described as having exemplary designs, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A differential assembly comprising:

a casing which rotates about a first axis, said casing having an internal cavity;

an elongate cylindrical cross pin which rotates with said casing about said first axis, said cross pin extending along a second axis through said cavity, said second axis substantially perpendicular to said first axis;

a pair of pinion gears disposed within said cavity and about said cross pin, said pinion gears rotatable about said second axis;

a pair of side gears disposed within said cavity, said side gears in meshed engagement with said pinion gears, said side gears rotatable about said first axis;

a cross pin retention element disposed about said cross pin, said cross pin and said retention element fixed against substantial relative movement therebetween along said second axis, said retention element disposed adjacent said pinion gears; and wherein movement of said retention element relative to said casing along said second axis is restricted by said pinion gears, whereby said cross pin is retained in said casing.

2. The differential assembly of claim 1, wherein said cross pin is retained by said casing against movement along the direction of said first axis.

3. The differential assembly of claim 1, wherein said casing comprises a wall portion, said cross pin engaged with said casing wall portion, said cross pin urged into rotation about said first axis through its said engagement with said casing wall portion.

4. The differential assembly of claim 3, wherein said casing wall portion is provided with a pair of aligned holes, said cross pin extending through and between said aligned holes, whereby said cross pin is engaged with said casing wall portion.

5. The differential assembly of claim 1, further comprising an output member rotatably fixed to each said side gear.

6. The differential assembly of claim 5, wherein said retention element is disposed between said side gears.

7. The differential assembly of claim 6, wherein said differential assembly is a limited slip differential assembly comprising a clutch, said rotating casing and said output members frictionally coupled together through engagement of said clutch, whereby relative rotation between said casing and said output members is restricted during engagement of said clutch.

8. The differential assembly of claim 7, wherein said clutch frictionally links one of said side gears and said casing.

9. The differential assembly of claim 8, wherein said clutch is engaged in response to a clutch initiating force, said clutch moved along said first axis into engagement in response to said clutch initiating force.

10. A limited slip differential assembly comprising:
- a casing which rotates about a first axis, said casing having an internal cavity;
- an elongate cylindrical cross pin which rotates with said casing about said first axis, said cross pin extending along a second axis through said cavity, said second axis substantially perpendicular to said first axis;
- a pair of pinion gears disposed within said cavity and about said cross pin, said pinion gears rotatable about said second axis;
- a pair of side gears disposed within said cavity, said side gears in meshed engagement with said pinion gears, said side gears rotatable about said first axis;
- an output member rotatable fixed to each said side gear;
- a cross pin retention element disposed about said cross pin, said cross pin and said retention element fixed against substantial relative movement therebetween along said second axis said retention element disposed adjacent said pinion gears and between said side gears;
- wherein movement of said retention element relative to said casing along said second axis is restricted by said pinion gears, whereby said cross pin is retained in said casing;
- a clutch, said rotating casing and said output members frictionally coupled together through engagement of said clutch, whereby relative rotation between said casing and said output members is restricted during engagement of said clutch, whereby relative rotation between said casing and said output members is restricted during engagement of said clutch, said clutch frictionally links one of said side gears and said casing, wherein said clutch is engaged in response to a clutch initiating force, said clutch moved along said first axis into engagement in response to said clutch initiating force; and
- an electromagnet, and wherein said clutch initiating force is a magnetic force generated in response to said electromagnet being electrically energized.

11. A limited slip differential assembly comprising:
- a casing which rotates about a first axis, said casing having an internal cavity;
- an elongate cylindrical cross pin which rotates with said casing about said first axis, said cross pin extending along a second axis through said cavity, said second axis substantially perpendicular to said first axis;
- a pair of pinion gears disposed within said cavity and about said cross pin, said pinion gears rotatable about said second axis;
- a pair of side gears disposed within said cavity, said side gears in meshed engagement with said pinion gears said side gears rotatable about said first axis;
- an output member rotatable fixed to each said side gear;
- a cross pin retention element disposed about said cross pin, said cross pin and said retention element fixed against substantial relative movement therebetween along said second axis, said retention element disposed adjacent said pinion gears and between said side gears;
- wherein movement of said retention element relative to said casing along said second axis is restricted by said pinion gears, whereby said cross pin is retained in said casing;
- a clutch, said rotating casing and said output members frictionally coupled together through engagement of said clutch, whereby relative rotation between said casing and said output members is restricted during engagement of said clutch, said clutch frictionally links one of said side gears and said casing; wherein said clutch is a first clutch, said first clutch is rotated relative to said one of said side gears during clutch engagement, each of said side gears in abutting contact with said retention element, and said side gears and said retention element are axially moveable along said first axis;
- a second clutch operatively connected to the other of said side gears, said second clutch moved along said first axis into engagement, said rotating casing and said output members frictionally coupled together through engagement of said second clutch, whereby relative rotation between said casing and said output members is further restricted during engagement of said second clutch;
- means for inducing axial movement of said one of said side gears in response to relative rotation between said first clutch and said one of said side gears; and
- wherein said one of said side gears is moved along said first axis in response to relative rotation between said first clutch and said one of said side gears, said other of said side gears is moved along said first axis in response to said movement of said one of said side gears, and said second clutch is moved axially by said other of said side gears and into engagement.

12. The differential assembly of claim 11, wherein said first and second clutches are cone clutches.

13. The differential assembly of claim 11, wherein said means comprises an interacting camming mechanism.

14. The differential assembly of claim 13, wherein said interacting camming mechanism is a ball ramp arrangement.

15. The differential assembly of claim 11, wherein said second clutch is fixed to said other of said side gears.

16. The differential assembly of claim 1, wherein said cylindrical cross pin extends through a first oblong aperture in said retention element, said first oblong aperture having a length which extends along the directions of said first axis, said cross pin slidably engaged with said retention element within said first oblong aperture, whereby said retention element is moveable relative to said cross pin along said first axis.

17. A differential assembly comprising:
- a casing which rotates about a first axis, said casing having an internal cavity;
- an elongate cylindrical cross pin which rotates with said casing about said first axis, said cross pin extending along a second axis through said cavity, said second axis substantially perpendicular to said first axis, said cylindrical cross pin extends through a first oblong aperture in said retention element, said first oblong aperture having a length which extends along the directions of said first axis, said cross pin slidably engaged with said retention element within said first oblong aperture, whereby said retention element is movable relative to said cross pin along said first axis;
- said cylindrical cross pin is provided with a laterally extending aperture through the approximate longitudinal center of the cross pin, and said retention element is provided with a second aperture aligned with said cross pin aperture, and further comprising an elongate fastener extending through said cross pin aperture and said second retention element aperture, said cross pin and said retention element fixed against substantial relative movement therebetween along said second axis through said fastener;

at least one pinion gear disposed within said cavity and about said cross pin, said at least one pinion gear rotatable about said second axis;

a pair of side gears disposed within said cavity, said side gears in meshed engagement with said at least one pinion gear, said side gears rotatable about said first axis;

a cross pin retention element disposed about said cross pin, said cross pin and said retention element fixed against substantial relative movement therebetween along said second axis, said retention element disposed adjacent said at least one pinion gear; and wherein movement of said retention element relative to said casing along said second axis is restricted, whereby said cross pin is retained in said casing.

18. The differential assembly of claim 17, wherein said cross pin aperture is oblong and has a length which extends in directions along said first axis, and said fastener is fixed to said retention element, said fastener slidably engaged with said cross pin within said oblong cross pin aperture.

19. The differential assembly of claim 18, wherein said fastener is a bolt, said bolt threadedly received in said second retention element aperture.

20. The differential assembly of claim 17, wherein said second retention element aperture is oblong and has a length which extends in directions along said first axis, and said fastener is fixed to said cross pin, said fastener slidably engaged with said retention element within said second oblong retention element aperture.

21. The differential assembly of claim 20, wherein said fastener is a spring pin, said spring pin interference fitted into said cross pin aperture.

22. A differential assembly comprising:

a casing rotatable about a first axis;

an elongate cylindrical cross pin fixed to said casing, said cross pin extending through said casing along a second axis substantially perpendicular to said first axis, said cross pin having a hole extending laterally therethrough;

a pinion gear disposed within said casing and rotatably disposed upon said cross pin, said pinion gear revolving about said first axis;

a pair of side gears intermeshed with said pinion gear;

a cross pin retention element disposed about said cross pin, said retention element provided with a hole aligned with said lateral cross pin hole, said retention element disposed adjacent said pinion gear and between said side gears; and a fastener extending through said aligned retention element and cross pin holes, whereby said retention element and said cross pin are attached to each other;

wherein said cross pin is supported along said second axis within said casing by the engagement of said fastener with said retention element and cross pin holes.

23. The differential assembly of claim 22, wherein relative movement between said cross pin and said retention element along said second axis is restricted by said engagement of said fastener with said retention element and cross pin holes.

24. The differential assembly of claim 23, wherein said retention element abuts said pinion gear.

25. The differential assembly of claim 22, further comprising an output member rotatably fixed to each said side gear.

26. The differential assembly of claim 25, wherein each said output member abuts said cross pin, whereby movement of each said output member along said first axis restricted.

27. The differential assembly of claim 25, wherein each of said pair of side gears is in abutment with said retention element, and each of said pair of side gears and said retention element are moveable along said first axis, and further comprising:

first and second clutches which move along said first axis into operative engagement between said casing and said output members, whereby relative rotation between said output members and said casing about said first axis is restricted, said first clutch attached to one of said pair of side gears, said first clutch and said one of said pair of side gears rotatable relative to each other about said first axis; and means for driving one of said pair of side gears along said first axis and towards said cross pin in response to relative rotation between said first clutch and said one of said pair of side gears;

wherein said second clutch is rotatably fixed to the other of said pair of side gears and, in response to movement of said one of said pair of side gears towards said cross pin, said second clutch is moved along said first axis with said other of said pair of side gears and into operative engagement, whereby relative rotation between said output members and said casing about said first axis is further restricted.

28. The differential assembly of claim 27, wherein said first clutch is moved into operative engagement in response to a clutch initiating force exerted on said first clutch.

29. The differential assembly of claim 28, further comprising an electromagnet, and wherein said clutch initiating force is electromagnetic.

30. The differential of claim 27, wherein said first and second clutches are cone clutches.

31. The differential of claim 27, wherein said cross pin hole is oblong and has a length which extends in directions along said first axis, and said fastener is fixed to said retention element, said fastener slidably engaged with said cross pin within said oblong cross pin hole.

32. The differential assembly of claim 31, wherein said fastener is a bolt, said bolt threadedly received in said second retention element hole.

33. The differential assembly of claim 27, wherein said retention element hole is oblong and has a length which extends in directions along said first axis, and said fastener is fixed to said cross pin, said fastener slidably engaged with said retention element within said oblong retention element hole.

34. The differential assembly of claim 33, wherein said fastener is a spring pin, said spring pin interference fitted into said cross pin hole.

* * * * *

UNITED STATES PATENT AND TRADEMARK OFFICE
CERTIFICATE OF CORRECTION

PATENT NO. : 6,254,505 B1 Page 1 of 1
DATED : July 3, 2001
INVENTOR(S) : James L. Forrest It is certified that error appears in the above-identified patent and that said Letters Patent is hereby corrected as shown below:

Column 11,
Line 19, change "rotatable" to -- rotatably --
Line 58, change "rotatable" to -- rotatably --

Signed and Sealed this

Eighth Day of July, 2003

JAMES E. ROGAN
*Director of the United States Patent and Trademark Office*